United States Patent
Lee et al.

(10) Patent No.: US 8,949,602 B2
(45) Date of Patent: Feb. 3, 2015

(54) METHOD AND APPARATUS FOR AUTHENTICATING PER M2M DEVICE BETWEEN SERVICE PROVIDER AND MOBILE NETWORK OPERATOR

(75) Inventors: Ji-Cheol Lee, Suwon-si (KR); Song-Yean Cho, Seoul (KR); Alper Yegin, Istanbul (TR); Young-Kyo Baek, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 163 days.

(21) Appl. No.: 13/327,575

(22) Filed: Dec. 15, 2011

(65) Prior Publication Data
US 2012/0159167 A1    Jun. 21, 2012

(30) Foreign Application Priority Data
Dec. 16, 2010  (KR) ........................ 10-2010-0128856

(51) Int. Cl.
*H04L 9/32* (2006.01)

(52) U.S. Cl.
USPC ........................................................ 713/168

(58) Field of Classification Search
USPC ........................................................ 713/168
See application file for complete search history.

(56) References Cited

U.S. PATENT DOCUMENTS

| 2009/0191857 | A1* | 7/2009 | Horn et al. ............... | 455/419 |
| 2010/0106967 | A1* | 4/2010 | Johansson et al. ........... | 713/158 |
| 2010/0304716 | A1  | 12/2010 | Hoeksel et al. | |
| 2012/0047551 | A1* | 2/2012 | Pattar et al. ................ | 726/1 |

OTHER PUBLICATIONS

International Search Report dated Apr. 26, 2012 in connection with International Patent Application No. PCT/KR2011/009748.
Written Opinion of International Searching Authority dated Apr. 26, 2012 in connection with International Patent Application No. PCT/KR2011/009748.
3GPP TSG SA WG2 Meeting #79 "Simplified Registration of Device Identity and Authentication"; Kyoto, Japan; May 10-14, 2010, 3 pages.
3GPP TSG SA WG3 Security #53 "Re-introducing OMA DM Bootstrap", Kyoto, Japan; Nov. 10-14, 2008, 2 pages.
3GPP TSG SA WG3 Security S3#56 "Restructuring and Clarification of Annex"; Seattle, USA; Jul. 6-10, 2009, 9 pages.

* cited by examiner

*Primary Examiner* — Esther Benoit

(57) ABSTRACT

A system is capable of authenticating a service per Machine to Machine (M2M) device between an M2M service provider and a mobile communication operator. The system includes an authentication server for generating an M2M device IDentifier (ID), a first authentication key, and an M2M service provider ID per M2M device, The authentication server also generates a second authentication key, a first hash function value, and a first random variable based on the M2M device ID, the first authentication key, and the M2M service provider ID, and transmitting the second authentication key, the first hash function, and the first random variable to an M2M agent to an M2M agent.

12 Claims, 7 Drawing Sheets

METHOD AND APPARATUS FOR AUTHENTICATING PER M2M DEVICE BETWEEN SERVICE PROVIDER AND MOBILE NETWORK OPERATOR

CROSS-REFERENCE TO RELATED APPLICATION(S) AND CLAIM OF PRIORITY

The present application is related to and claims priority under 35 U.S.C. §119 to a Korean patent application filed in the Korean Intellectual Property Office on Dec. 16, 2010, and assigned Serial No. 10-2010-0128856, the contents of which is herein incorporated by reference.

TECHNICAL FIELD OF THE INVENTION

The present invention relates generally to Machine to Machine (M2M) communication.

BACKGROUND OF THE INVENTION

As the Internet proliferates, the Internet is not only the technique for research of experts but also part of daily life of ordinary people. Internet users want to utilize the Internet for new and various purposes in the far wider areas than before. An application service according to such new requirements encompasses not only communication between persons but also communications between the person and a machine and between devices, and enhances convenience.

Machine to Machine (M2M) is a remote management and control solution for supporting the communication for data transmission between a device and a server using a wired and wireless communication scheme. The M2M is implemented using a module for connecting with a device not having a communication function. Various devices can be connected to the M2M module, and various applications can run according to a type of the connected device. For example, the M2M module has Wideband Code Division Multiple Access (WCDMA), Global System for Mobile communications (GSM)/General Packet Radio Service (GPRS) Tri-band, and Global Positioning System (GPS) capabilities, and is applicable to diverse applications such as low-speed/high-speed data communication, remote meter reading, location tracking, and remote control.

Meanwhile, in the related art, a Security Association (SA) uses a web-based interface between a mobile communication operator and an M2M service provider which provides various M2M application services. For example, Transport Layer Security (TLS) and Security Sockets Layer (SSL) can be adopted. While these schemes can provide the SA between the mobile communication operator and the M2M service provider, they cannot provide authentication to the M2M device in the roaming.

Hence, a method and an apparatus for authenticating a service per M2M device between the M2M service provider and the mobile network operator are required.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present disclosure is to provide a method and an apparatus for authenticating a service per M2M device between an M2M service provider and a mobile network operator.

Another aspect of the present disclosure is to provide a method and an apparatus for generating a service session key per M2M device between an M2M service provider and a mobile network operator.

According to one aspect of the present disclosure, an operating method of an authentication server for authenticating a service per Machine to Machine (M2M) device between an M2M service provider and a mobile communication operator includes generating an M2M device IDentifier (ID), a first authentication key, and an M2M service provider ID per M2M device; based on the M2M device ID, the first authentication key, and the M2M service provider ID, generating a second authentication key, a first hash function value, and a first random variable; and transmitting at least one of the second authentication key, the first hash function, and the first random variable to an M2M agent.

According to another aspect of the present disclosure, an operating method of an M2M agent for authenticating a service per M2M device between an M2M service provider and a mobile communication operator includes receiving at least one of a second authentication key, a first hash function value, and a first random variable from an authentication server; transmitting at least one of the first hash function, the first random variable, a Home Operator IDentifier (H-OPID), a Visited Operator ID (V-OPID), an M2M device ID, and an M2M agent ID to an M2M server; receiving at least one of a second random variable and a second hash function value from the M2M server; and verifying the second hash function value received from the M2M server by comparing the second hash function value received from the M2M server and a second hash function value generated by the M2M agent.

According to yet another aspect of the present disclosure, an operating method of an M2M server for authenticating a service per M2M device between an M2M service provider and a mobile communication operator includes receiving from an M2M agent, at least one of a first hash function, a first random variable, a H-OPID, a V-OPID, an M2M device ID, and an M2M agent ID; verifying the first hash function value received from the M2M agent by comparing the first hash function received from the M2M agent and a first hash function value generated by the M2M server; generating at least one of a second authentication key, a second random variable, and a second hash function value using at least one of the first hash function, the first random variable, the H-OPID, the V-OPID, the M2M device ID, and the M2M agent ID received from the M2M agent; and transmitting at least one of the second random variable and the second hash function value to the M2M agent.

According to still another aspect of the present disclosure, a system for authenticating, a service per M2M device between an M2M service provider and a mobile communication operator includes an authentication server for generating an M2M device ID, a first authentication key, and an M2M service provider ID per M2M device, generating a second authentication key, a first hash function value, and a first random variable based on the M2M device ID, the first authentication key, and the M2M service provider ID, and transmitting the second authentication key, the first hash function, and the first random variable to an M2M agent; the M2M agent for receiving at least one of the second authentication key, the first hash function value, and the first random variable from the authentication server, transmitting at least one of the first hash function, the first random variable, a H-OPID, a V-OPID, an M2M device ID, and an M2M agent ID to an M2M server, receiving at least one of a second random variable and a second hash function value from the M2M server, and verifying the second hash function value received from the M2M server by comparing the second hash function value received from the M2M server and a second hash function value generated by the M2M agent; and the M2M server for receiving from the M2M agent, at least one of the first hash function, the first random variable, the H–OPID, the V–OPID, the M2M device ID, and the M2M agent ID, verifying the first hash function value received from the M2M agent by comparing the first hash function received from the M2M agent and a first hash function value generated by the M2M server, generating at least one of the second authentication key, the second random variable, and the second hash function value using at least one of the first hash function, the first random variable, the H–OPID, the V–OPID, the M2M device ID, and the M2M agent ID received from the M2M agent, and transmitting at least one of the second random variable and the second hash function value to the M2M agent.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1A:
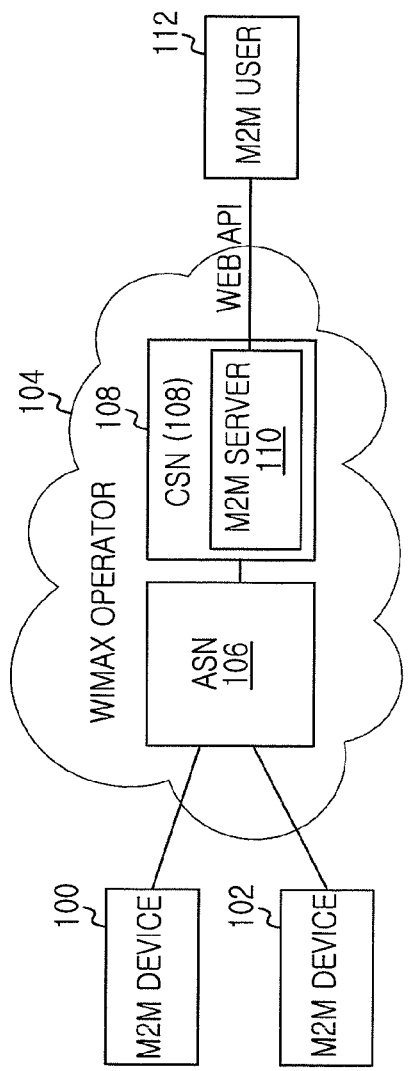
FIGS. 1A and 1B illustrate an M2M communication network according to an exemplary embodiment of the present invention.

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present disclosure provide a method and an apparatus for authenticating a service per Machine to Machine (M2M) device between an M2M service provider and a mobile network operator.

FIG. 1 depicts an M2M communication network according to an exemplary embodiment of the present disclosure.

Referring to FIG. 1, the M2M communication network includes an M2M server 110, M2M devices 100 and 102, an Access Service Network (ASN) 106, a Connectivity Service Network (CSN) 108, and an M2M server 112.

The ASN 106 and the CSN 108 are networks managed by a WiMAX operator. The ASN 106 and the CSN 108 can include a plurality of equipments.

The ASN 106 controls a base station which provides wireless access to a mobile station, and manages connection of the CSN 108. The CSN 108 is a network entity which interconnects the ASN 106 and the Internet (not shown). The CSN 108 includes the M2M server 110. In various implementations, the CSN 108 can include an Authentication, Authorization, and Accounting (AAA) server.

The M2M server 110 provides a web portal interface for the M2M user 112. For example, the M2M user 112 can obtain information sent from the M2M devices 100 and 102 by accessing the M2M server 110.

According to the M2M service type, the M2M devices 100 and 102 can be one of a black box mounted to a vehicle, a vending machine, a smart metering device, a surveillance video, a remote diagnostic device, and a traffic information device.

As an example of the M2M service, a car rental company mounts the black box to the vehicle, and when the corresponding vehicle is rented, periodically provides the M2M server 110 with information such as location, speed, vehicle maintenance data, travel distance, and fuel use from the rented vehicle. The black box conducts the device authentication over a WiMAX network 104. Next, when the rented vehicle is returned, the total fee can be automatically approved from the account of the rental user based on data stored to the M2M server 110. As such, the approval can be automatically processed without any intervention of the person who lends the car or the person who rents the car.

Figure 1B:
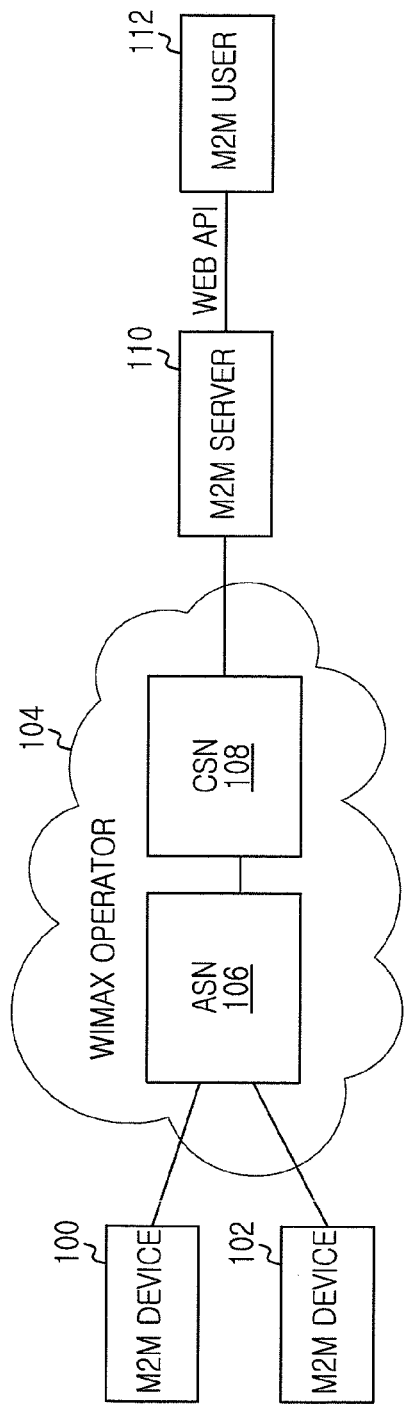

The M2M server 110 can be accommodated in the CSN 108 as shown in FIG. 1A. Alternatively, the M2M server 110 can be disposed outside the CSN 108 as shown in FIG. 1B.

Figure 2:
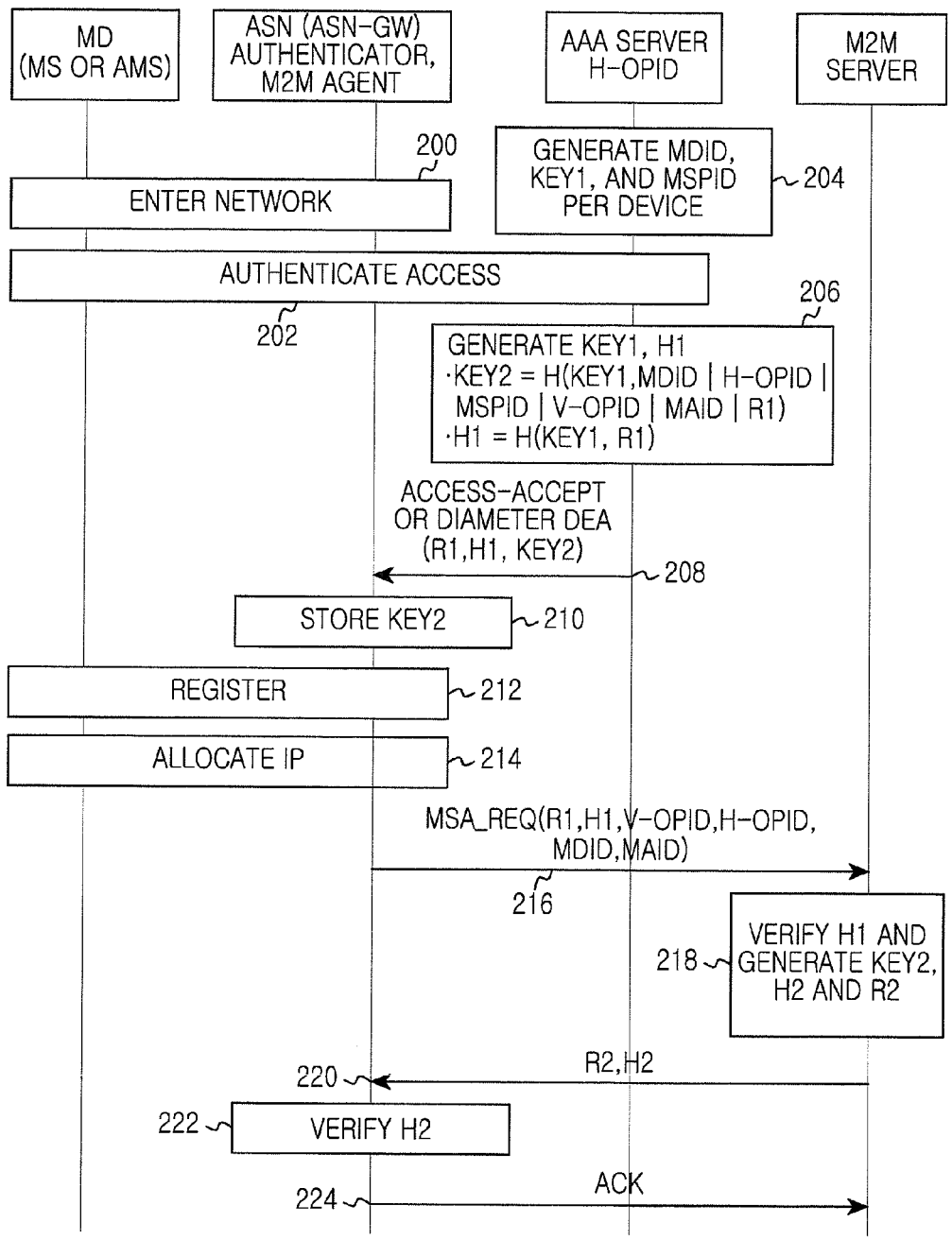
FIG. 2 illustrates a sequence diagram of per M2M device service authentication between an M2M service provider and a WiMAX operator according to one exemplary embodiment of the present disclosure.

FIG. 2 is a sequence diagram of per M2M device service authentication between an M2M service provider and a WiMAX operator according to one exemplary embodiment of the present disclosure.

Referring to FIG. 2, an M2M terminal (or an M2M device) and the ASN perform the network entry procedure as defined in Institute of Electrical and Electronics Engineers (IEEE) 802.16m in block 200, perform the authentication procedure in block 202, and perform the registration procedure in block 212. In block 214, an Internet Protocol (IP) address is allocated through Dynamic Host Configuration Protocol (DHCP) procedure.

The AAA server which authenticates the device generates an M2M Device ID (MDID), a KEY1, and an M2M Service Provider ID (MSPID) per M2M device in a predefined procedure in block 204. The MDID is an M2M device ID, the MSPID is an M2M service provider ID, and the KEY1 is a shared key per device between the mobile communication operator and the M2M service provider. The KEY1 is shared by the M2M server and the AAA server, and is a root key per M2M device to generate a secure tunnel between the M2M server and an M2M client (e.g., ASN-GW) of the mobile communication operator. The KEY1 can be transferred when M2M business is agreed between the providers.

In block 206, the AAA server generates a KEY2 and a H1 using the corresponding MDID, KEY1, and MSPID. The KEY2 is an authentication key between the M2M client (the mobile communication operator or the visited operator) and the M2M server. The H1, as a resultant value of a hash function with the input of the KEY1 and the R1, is a hash function allowing the M2M server to verify the M2M agent of the visited operator. The KEY2 and the H1 are given by Equation 1.

$$KEY2 = H(KEY1, MDID|OPID|MSPID|V\text{-}OPID|MAID|R1)$$

$$H1 = H(KEY1, R1) \quad \text{[Eq. 1]}$$

In Equation 1, H( ) denotes the hash function, MDID denotes the M2M device ID, H-OPID denotes a home operator ID, V-OPID denotes a visited operator ID, MAID denotes an M2M agent ID, and R1 denotes a random value or a nonce value generated by the AAA server of the H-Operator. The M2M agent runs the M2M service in place of the M2M device, and the M2M agent becomes the ASN-GW.

In block 208, the AAA server provides the generated R1, H1, and KEY2 values to the ASN-GW or the M2M agent.

The ASN-GW or the M2M agent stores the KEY2 in block 210 and provides the R1, the H1, V-OPID, H-OPID, MDID, and MAID to the M2M server in block 216.

The M2M server verifies the H1 by comparing the H1 received from the ASN-GW or the M2M agent and the H1 generated by the M2M server, and generates a KEY2, a H2, and a R2 in block 218. The KEY2 is the authentication key between the M2M client (the mobile communication operator or the visited operator) and the M2M server. The H2, which is the result value of the hash function, is a hash function for the M2M agent to verify the M2M server. The KEY2 and the H2 are given by Equation 2.

$$KEY2 = H(KEY1, MDID|H\text{-}OPID|MSPID|V\text{-}OPID|MAID|R1)$$

$$H2 = H(KEY2, R2|MSPID|V\text{-}OPID|MAID|MDID|R1) \quad \text{[Eqn. 2]}$$

In Equation 2, H( ) denotes the hash function, MDID denotes the M2M device ID, H-OPID denotes the home operator ID, V-OPID denotes the visited operator ID, MAID denotes the M2M agent ID, and R2 denotes a random value or a nonce value generated by the M2M server of the M2M service provider. The M2M agent runs the M2M service in place of the M2M device, and the M2M agent becomes the ASN-GW.

Next, the M2M server provides the R2 and the H2 to the ASN-GW or the M2M agent in block 220 and receives ACknowledge (ACK) in block 224.

Herein, the ASN-GW or the M2M agent verifies the H2 by comparing the H2 received from the M2M server and the H2 generated by the ASN-GW or the M2M agent in block 222.

After the M2M client and the M2M server of the mobile communication network are stably connected, the M2M server and the ASN-GW (or the M2M agent) can generate from the KEY2 and use a KEY3 to authenticate an additional message (not shown). The KEY3 is given by Equation 3.

$$KEY3 = H(KEY2, R1|R2|MAID|V\text{-}OPID|MSPID) \quad \text{[Eqn. 3]}$$

As above, FIG. 2 shows the M2M agent in the ASN-GW. In other implementations, the M2M agent can be a separate network entity (e.g., a proxy server). When the M2M agent is the proxy server, the per M2M device service authentication between the M2M service provider and the mobile network operator is illustrated by referring to FIG. 3.

Figure 3:
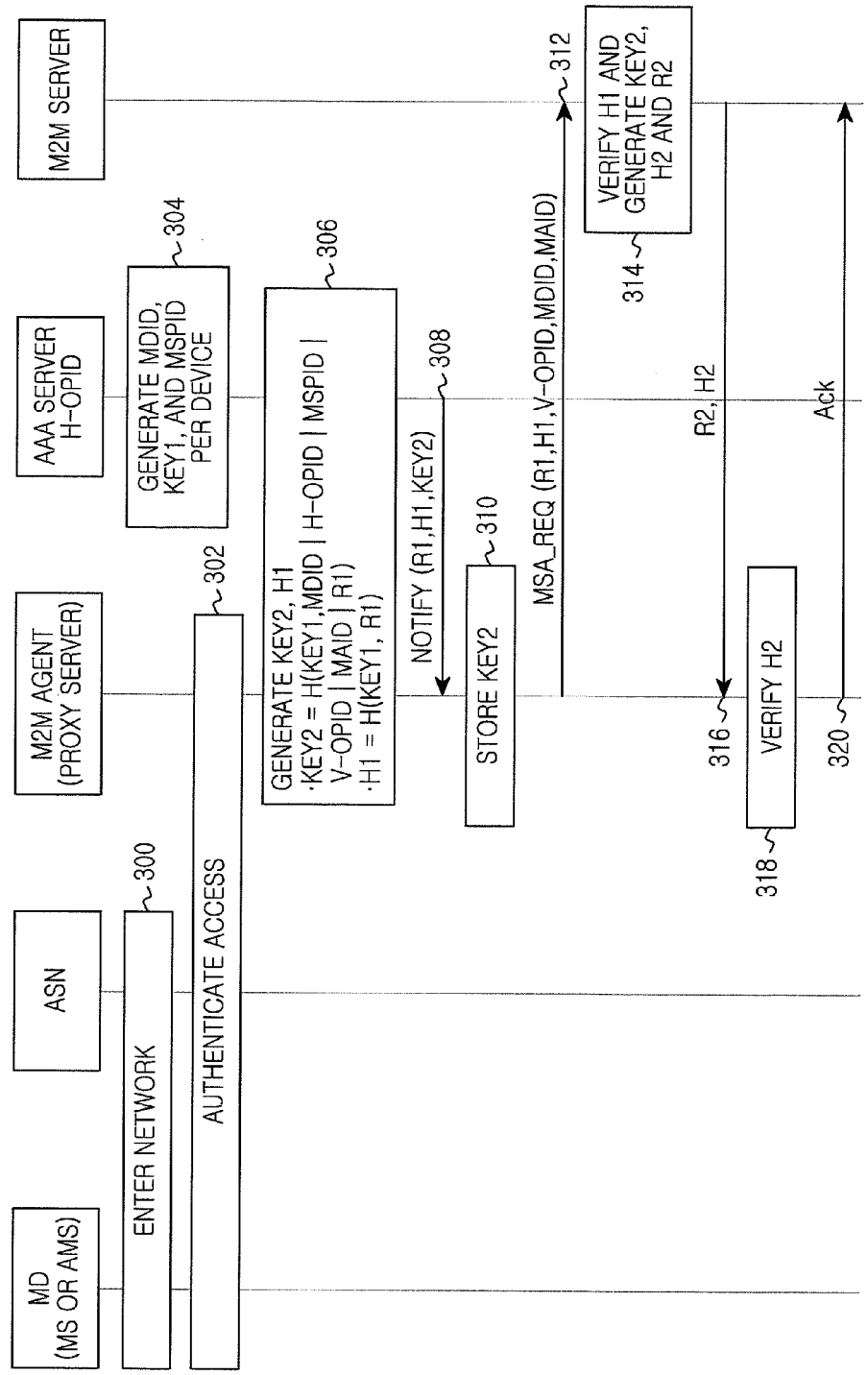
FIG. 3 illustrates a sequence diagram of the per M2M device service authentication between the M2M service provider and the WiMAX operator according to another exemplary embodiment of the present disclosure.

FIG. 3 depicts the per M2M device service authentication between the M2M service provider and the WiMAX operator according to another exemplary embodiment of the present disclosure.

In FIG. 3, the M2M terminal (or the M2M device) and the ASN perform the network entry procedure as defined in the IEEE 802.16m in block 300, and perform the authentication procedure in block 302.

The AAA server which authenticates the device generates the MDID, the KEY1, and the MSPID per M2M device in a predefined manner in block 304. The MDID is the M2M device ID, the MSPID is the M2M service provider ID, and the KEY1 is the shared key per device between the mobile communication operator and the M2M service provider. The KEY1 is shared by the M2M server and the AAA server, and is the root key per M2M device to generate the secure tunnel between the M2M server and the M2M client (e.g., ASN-GW) of the mobile communication operator. The KEY1 can be transferred when the M2M business is agreed between the providers.

In block 306, the AAA server generates the KEY2 and the H1 using the corresponding MDID, KEY1, and MSPID. The KEY2 is the authentication key between the M2M client (the mobile communication operator or the visited operator) and the M2M server. The H1, as the resultant value of the hash function with the input of the KEY1 and the R1, is the hash function allowing the M2M server to verify the M2M agent of the visited operator. The KEY2 and the H1 are given by Equation 1.

In block 308, the AAA server provides the generated R1, H1, and KEY2 values to the proxy server or the M2M agent.

The proxy server or the 1\42M agent stores the KEY2 in block 310 and provides the R1, the H1, V-OPID, H-OPID, MDID, and MAID to the M2M server in block 312.

The M2M server verifies the H1 by comparing the H1 received from the proxy server or the M2M agent and the H1 generated by the M2M server, and generates the KEY2, the H2, and the R2 in block 314. The KEY2 is the authentication key between the M2M client (the mobile communication operator or the visited operator) and the M2M server. The H2, as the result value of the hash function, is the hash function for the M2M agent to verify the M2M server. The KEY2 and the H2 are given by Equation 2.

Next, the M2M server provides the R2 and the H2 to the proxy server or the M2M agent in block 316 and receives ACknowledge (ACK) in block 320.

Herein, the proxy server or the M2M agent verifies the H2 by comparing the H2 received from the M2M server and the H2 generated by the proxy server or the M2M agent in block 318.

After the M2M client and the M2M server of the mobile communication network are stably connected, the M2M server and the proxy server (or the M2M agent) can generate from the KEY2 and use the KEY3 for the additional message authentication (not shown). The KEY3 is given by Equation 3.

Figure 4:
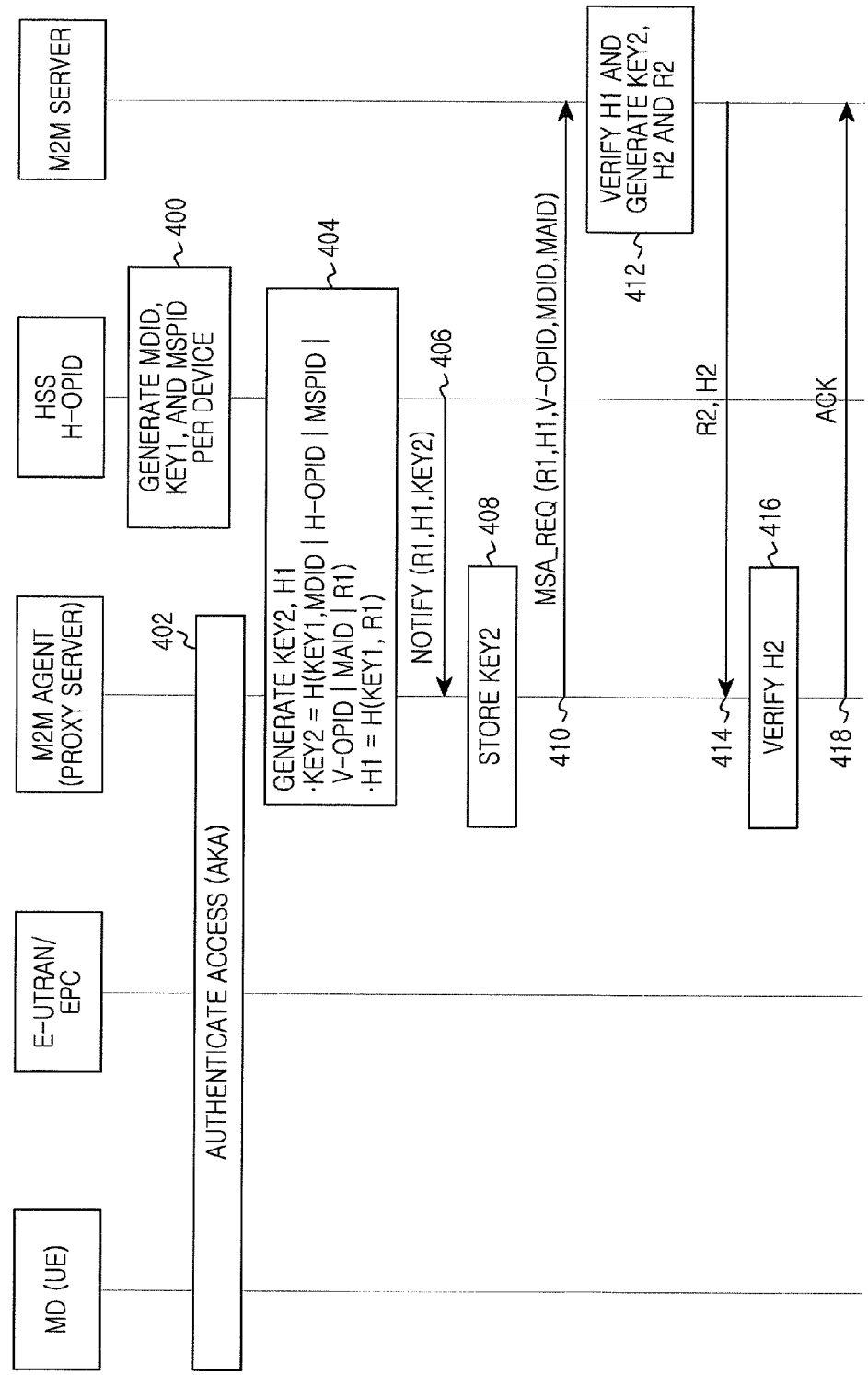
FIG. 4 illustrates a sequence diagram of the per M2M device service authentication between the M2M service provider and an LTE operator according to yet another exemplary embodiment of the present disclosure.

FIG. 4 depicts the per M2M device service authentication between the M2M service provider and a Long Term Evolution (LTE) operator according to yet another exemplary embodiment of the present disclosure.

In FIG. 4, the M2M terminal (or the M2M device) and the proxy server which functions as the M2M agent perform an access authentication process as defined by $3^{rd}$ Generation Partnership Project (3GPP) standard in block 402.

A Home Subscriber Server (HSS) which manages subscriber information (location information, authentication information, service information, etc.) generates the MDID, the KEY1, and the MSPID per M2M device in a predefined manner in block 400. The MDID is the M2M device ID, the MSPID is the M2M service provider ID, and the KEY1 is the shared key per device between the mobile communication operator and the M2M service provider. The KEY1 is shared by the M2M server and the AAA server, and is the root key per M2M device to generate the secure tunnel between the M2M server and the M2M client (e.g., ASN-GW) of the mobile communication operator. The KEY1 can be transferred when the M2M business is agreed between the providers.

In block 404, the HSS generates the KEY2 and the H1 using the corresponding MDID, KEY1, and MSPID. The KEY2 is the authentication key between the M2M client (the mobile communication operator or the visited operator) and the M2M server. The H1, as the resultant value of the hash function with the input of the KEY1 and the R1, is the hash function allowing the M2M server to verify the M2M agent of the visited operator. The KEY2 and the H1 are given by Equation 1.

In block 406, the HSS provides the generated R1, H1, and KEY2 values to the proxy server or the M2M agent.

The proxy server or the M2M agent stores the KEY2 in block 408 and provides the R1, the H1, V-OPID, H-OPID, MDID, and MAID to the M2M server in block 410.

The M2M server verifies the H1 by comparing the H1 received from the proxy server or the M2M agent and the H1 generated by the M2M server, and generates the KEY2, the H2, and the R2 in block 412. The KEY2 is the authentication key between the M2M client (the mobile communication operator or the visited operator) and the M2M server. The H2, as the result value of the hash function, is the hash function for the M2M agent to verify the M2M server. The KEY2 and the H2 are given by Equation 2.

Next, the M2M server provides the R2 and the H2 to the proxy server or the M2M agent in block 414 and receives the ACK in block 418.

Herein, the proxy server or the M2M agent verifies the H2 by comparing the H2 received from the M2M server and the H2 generated by the proxy server or the M2M agent in block 416.

After the M2M client and the M2M server of the mobile communication network are stably connected, the M2M server and the proxy server (or the M2M agent) can generate from the KEY2 and use the KEY3 for the additional message authentication (not shown). The KEY3 is given by Equation 3.

Figure 5:
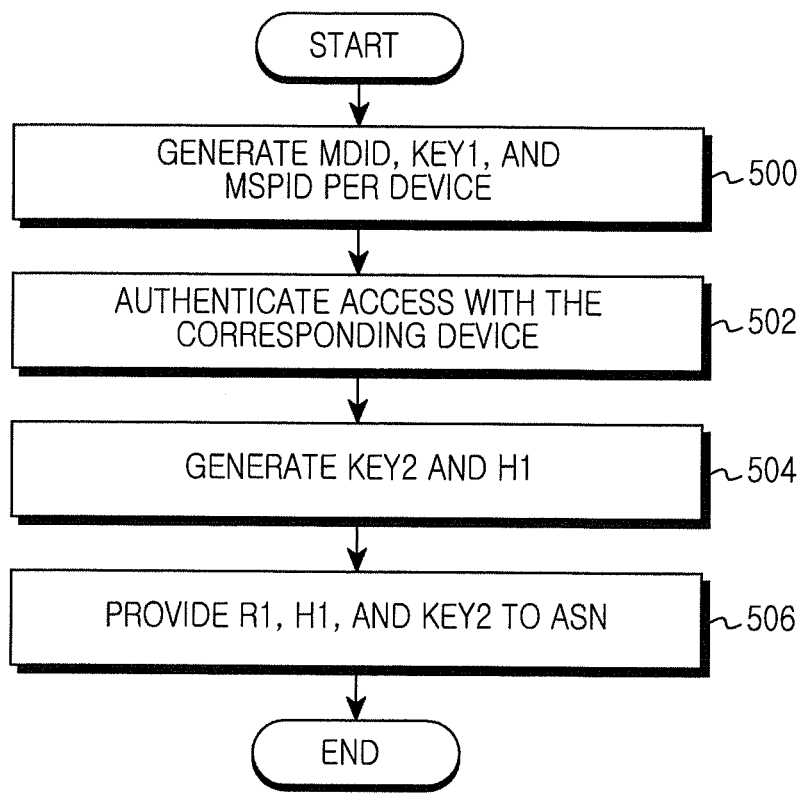
FIG. 5 illustrates a flowchart of an authentication server for the per M2M device service authentication between the M2M service provider and the mobile communication operator according to an exemplary embodiment of the present disclosure.

FIG. 5 illustrates the operations of the authentication server for the per M2M device service authentication between the M2M service provider and the mobile communication operator according to an exemplary embodiment of the present disclosure.

Referring to FIG. 5, the authentication server generates the MDID, the KEY1, and the MSPID per M2M device through the predefined procedure in block 500.

In block 502, the authentication server performs the corresponding authentication procedure with the M2M devices.

In block 504, the authentication server generates the KEY2 and the H1 using the corresponding MDID, KEY1, and MSPID. The KEY2 is the authentication key between the M2M client (the mobile communication operator or the visited operator) and the M2M server. The H1, as the result value of the hash function with the input of the KEY1 and the R1, is the hash function for the M2M server to verify the M2M agent of the visited operator. The KEY2 and the H1 are given by Equation 1.

In block 506, the authentication server provides the generated R1, H1, and KEY2 values to the MSM agent.

Figure 6:
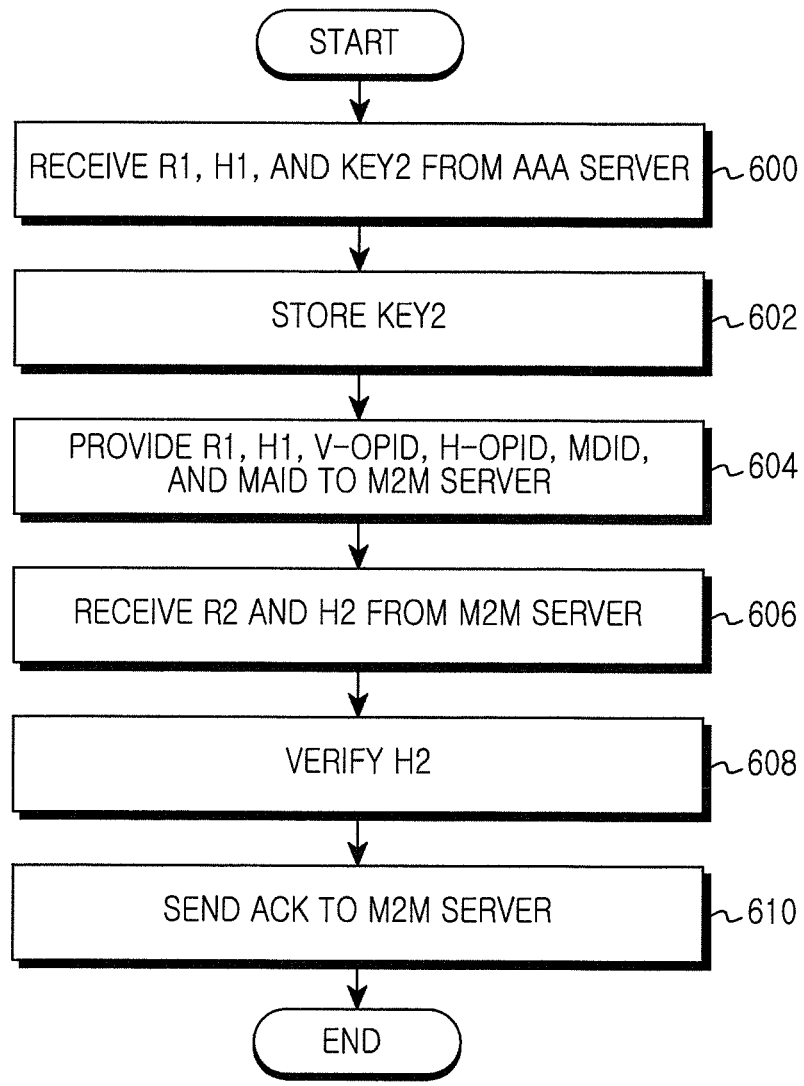
FIG. 6 illustrates a flowchart of an M2M agent for the per M2M device service authentication between the M2M service provider and the mobile communication operator according to an exemplary embodiment of the present disclosure.

FIG. 6 illustrates the operations of the M2M agent for the per M2M device service authentication between the M2M service provider and the mobile communication operator according to an exemplary embodiment of the present disclosure.

Referring to FIG. 6, the M2M agent receives the R1, the H1, and the KEY2 from the authentication server in block 600. The KEY2 is the authentication key between the M2M client (the mobile communication operator or the visited operator) and the M2M server, the H1 is the hash function allowing the M2M server to verify the M2M agent of the visited operator, and the R1 is the random value or the nonce value generated by the AAA server of the H-Operator.

The M2M agent stores the KEY2 received from the authentication server in block 602, and provides the R1, the H1, the V-OPID, the H-OPID, the MDID, and the MAID to the M2M server in block 604. The MDID is the M2M device ID, the H-OPID is the home operator ID, the V-OPID is the visited operator ID, and the MAID is the M2M agent ID.

In block 606, the M2M agent receives the R2 and the H2 from the M2M server. The H2, as the result value of the hash function, is the hash function for the M2M agent to verify the M2M server, and the R2 is the random value or the nonce value generated by the M2M server of the M2M service provider.

Next, the M2M agent verifies the H2 by comparing the H2 received from the M2M server and the H2 generated by the M2M agent in block 608, and sends the ACK to the M2M server in block 610.

Figure 7:
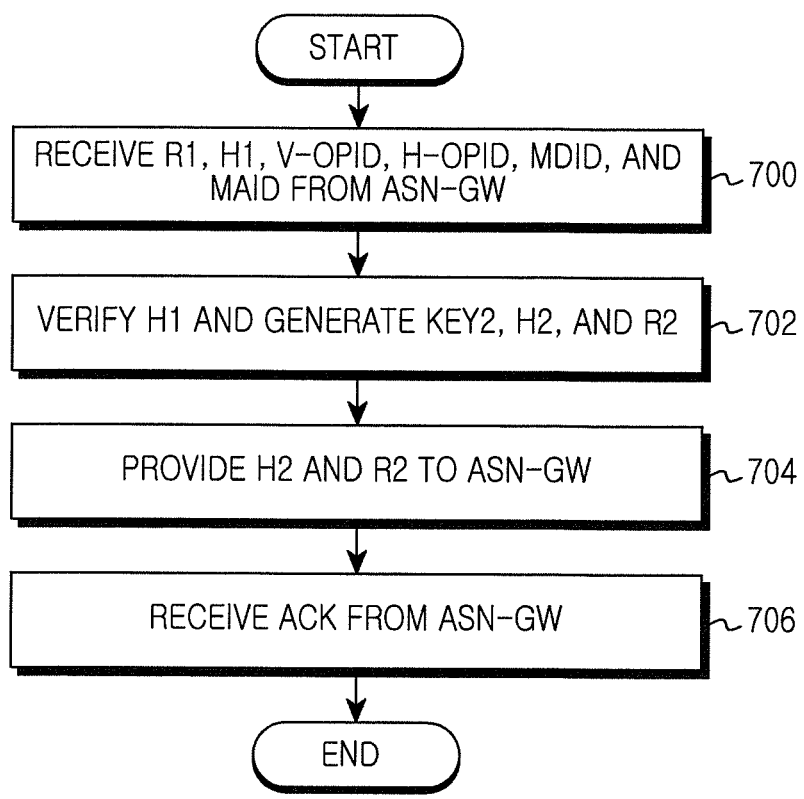
FIG. 7 illustrates a flowchart of an M2M server for the per M2M device service authentication between the M2M service provider and the mobile communication operator according to an exemplary embodiment of the present disclosure.

FIG. 7 illustrates the operations of the M2M server for the per M2M device service authentication between the M2M service provider and the mobile communication operator according to an exemplary embodiment of the present disclosure.

Referring to FIG. 7, the M2M server receives from the M2M agent, the R1, the H1, the V-OPID, the H-OPID, the MDID, and the MAID in block 700. The H1 is the hash function for the M2M server to verify the M2M agent of the visited operator, and the R1 is the random value or the nonce value generated by the AAA server of the H-Operator. The MDID is the M2M device ID, the H-OPID is the home operator ID, the V-OPID is the visited operator ID, and the MAID is the M2M agent ID.

In block 702, the M2M server verifies the H1 received from the M2M agent and the H1 generated by the M2M server, and generates the H2 and the R2. The H2, as the result value of the hash function, is the hash function for the M2M agent to verify the M2M server, and the R2 is the random value or the nonce value generated by the M2M server of the M2M service provider.

Next, the M2M server provides the generated H2 and R2 to the M2M agent in block 704, and receives the ACK from the M2M agent in block 706.

As set forth above, by defining the authentication procedure between the M2M server and the M2M agent, it is possible to provide the service authentication per M2M device and the session key between the M2M service provider and the mobile network operator.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a Machine to Machine (M2M) server for authenticating a service per M2M device between an M2M service provider and a mobile communication operator, the method comprising:
    receiving from an M2M agent, at least one of a first hash function value, a first random variable, a Home Operator Identifier (H-OPID), a Visited Operator ID (V-OPID), an M2M device ID, and an M2M agent ID;
    verifying the first hash function value received from the M2M agent by comparing the first hash function value received from the M2M agent and a first hash function value generated by the M2M server;
    generating at least one of a second authentication key, a second random variable, and a second hash function value using at least one of the first hash function value, the first random variable, the H-OPID, the V-OPID, the M2M device ID, and the M2M agent ID received from the M2M agent; and
    transmitting at least one of the second random variable and the second hash function value to the M2M agent.

2. The operating method of claim 1, wherein the second authentication key is an authentication key between the M2M server and an M2M client of the mobile communication operator,
    the first hash function value is a hash function value for the M2M server to verify the M2M agent, and
    the second hash function value is a hash function value for the M2M agent to verify the M2M server.

3. The operating method of claim 1, wherein the M2M agent is one of an Access Service Network (ASN)-GateWay (GW) and a proxy server.

4. The operating method of claim 1, wherein the second authentication key and the second hash function value are generated based on the following equation:

$$KEY2 = H(KEY1, MDID|H\text{-}OPID|MSPID|V\text{-}OPID|MAID|R1)$$

$$H2 = H(KEY2, R2|MSPID|V\text{-}OPID|MAID|MDID|R1)$$

where H( ) denotes a hash function, KEY1, as a first authentication key, denotes a root key per M2M device for Security Association (SA) between the M2M server and the M2M client, MDID denotes an M2M device ID, H-OPID denotes a home operator ID, V-OPID denotes a visited operator ID, MAID denotes an M2M agent ID, MSPID denotes an M2M service provider ID, and R1 denotes a random variable value generated by an authentication server.

5. The operating method of claim 1, further comprising:
    generating a third authentication key for authenticating a message between the M2M agent and the M2M server using the second authentication key.

6. The operating method of claim 5, wherein the third authentication key is given by the following equation:

$$KEY3 = H(KEY2, R1|R2|MAID|V\text{-}OPID|MSPID)$$

where H( ) denotes a hash function, KEY2 denotes an authentication key between the M2M server and the M2M client, R1 denotes the first random variable, R2 denotes the second random variable, MAID denotes an M2M agent ID, H-OPID denotes a home operator ID, V-OPID denotes a visited operator ID, and MSPID denotes an M2M service provider ID.

7. A Machine to Machine (M2M) server configured to authenticate a service per M2M device between an M2M service provider and a mobile communication operator, the M2M server comprising:
    a receiver configured to receive, from an M2M agent, at least one of a first hash function value, a first random variable, a Home Operator Identifier (H-OPID), a Visited Operator ID (V-OPID), an M2M device ID, and an M2M agent ID;
    processing circuitry configured to:
        verify the first hash function value received from the M2M agent by comparing the first hash function value received from the M2M agent and a first hash function value generated by the M2M server, and
        generate at least one of a second authentication key, a second random variable, and a second hash function value using at least one of the first hash function value, the first random variable, the H-OPID, the V-OPID, the M2M device ID, and the M2M agent ID received from the M2M agent; and
    a transmitter configured to transmit at least one of the second random variable and the second hash function value to the M2M agent.

8. The M2M server of claim 7, wherein the second authentication key is an authentication key between the M2M server and an M2M client of the mobile communication operator,
    the first hash function value is a hash function value for the M2M server to verify the M2M agent, and
    the second hash function value is a hash function value for the M2M agent to verify the M2M server.

9. The M2M server of claim 7, wherein the M2M agent is one of an Access Service Network (ASN)-GateWay (GW) and a proxy server.

10. The M2M server of claim 7, wherein the second authentication key and the second hash function value are generated based on the following equation:

$$KEY2 = H(KEY1, MDID|H\text{-}OPID|MSPID|V\text{-}OPID|MAID|R1)$$

$$H2 = H(KEY2, R2|MSPID|V\text{-}OPID|MAID|MDID|R1)$$

where H( ) denotes a hash function, KEY1, as a first authentication key, denotes a root key per M2M device for Security Association (SA) between the M2M server and the M2M client, MDID denotes an M2M device ID, H-OPID denotes a home operator ID, V-OPID denotes a visited operator ID, MAID denotes an M2M agent ID, MSPID denotes an M2M service provider ID, and R1 denotes a random variable value generated by an authentication server.

11. The M2M server of claim 7, wherein the processing circuitry further is configured to generate a third authentication key for authenticating a message between the M2M agent and the M2M server using the second authentication key.

12. The M2M server of claim 11, wherein the third authentication key is given by the following equation:

$$KEY3 = H(KEY2, R1|R2|MAID|V\text{-}OPID|MSPID)$$

where H( ) denotes a hash function, KEY2 denotes an authentication key between the M2M server and the M2M client, R1 denotes the first random variable, R2 denotes the second random variable, MAID denotes an M2M agent ID, H-OPID denotes a home operator ID, V-OPID denotes a visited operator ID, and MSPID denotes an M2M service provider ID.

* * * * *